W. H. BRISTOL.

THERMO ELECTRIC COUPLE.

APPLICATION FILED APR. 1, 1916.

Reissued Jan. 9, 1917. 14,243.

William H. Bristol INVENTOR.

BY

G. E. Terwilliger ATTORNEY

UNITED STATES PATENT OFFICE.

WILLIAM H. BRISTOL, OF WATERBURY, CONNECTICUT, ASSIGNOR TO THE BRISTOL COMPANY, OF WATERBURY, CONNECTICUT, A CORPORATION OF CONNECTICUT.

THERMO-ELECTRIC COUPLE.

14,243. Specification of Reissued Letters Patent. Reissued Jan. 9, 1917.

Original No. 811,313, dated February 6, 1906, Serial No. 267,534, filed June 30, 1905. Application for reissue filed April 1, 1913. Serial No. 58,358.

*To all whom it may concern:*

Be it known that I, WILLIAM H. BRISTOL, a citizen of the United States, and a resident of the city of Waterbury, in the State of Connecticut, have invented a certain new and useful Improvement in Thermo-Electric Couples, of which the following is a specification.

My invention relates to thermo-electric couples, and has for its particular object to construct a couple in such a manner that it may be readily and quickly installed and that the active portion may be renewed or removed without disturbing the remainder of the couple and apparatus.

For this purpose my invention consists, essentially, of a sectional or separable couple comprising a primary section and a secondary section and means adapted to firmly connect said sections so as to form, in effect, one continuous couple.

My invention will best be understood when described in connection with the accompanying drawings, in which—

Figure 1:
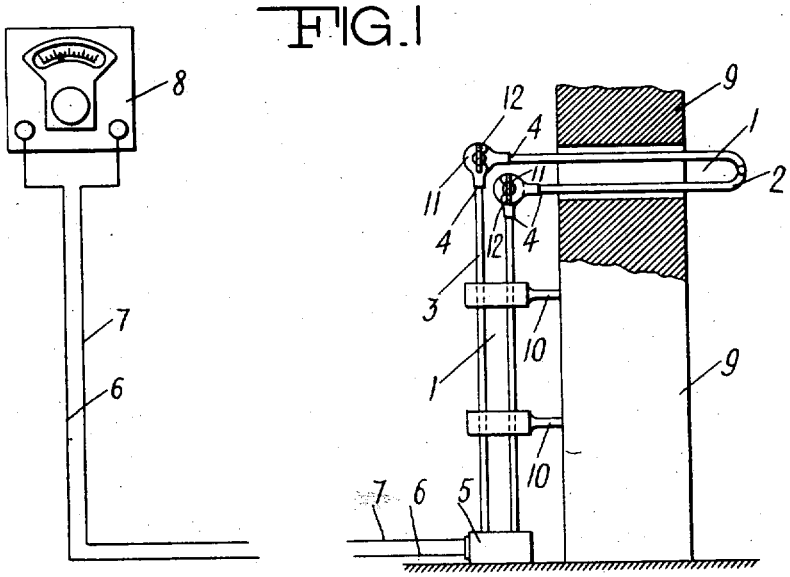
Figure 2:
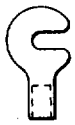
Figure 3:
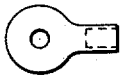
Figure 4:
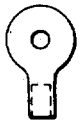
Figure 5:
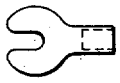

Figure 1 is a diagrammatic view illustrating my invention. Figs. 2 to 5 are detail views of the connecting means.

The ordinary form of thermo-electric couples comprises two elements, a positive and a negative element, united at one end, forming the so-called "hot" or active end of the couple, the outer or cold ends being the terminals of the couple and the point to which the leads or other wires are connected. In case of injury to the couple, such as the burning out of the hot ends, it is necessary to replace the entire couple by a new one, which is a comparatively expensive operation. Furthermore, the ordinary couple can be set up only temporarily and then is usually so placed that the cold ends are subjected to direct radiation from the furnace and the like and the couple is frequently in the way of the attendant.

It is the object of the present invention to obviate this difficulty and make the outer portion of the couple a permanent installation capable of being located so as not to interfere with other operation as well as to allow of the quick replacement of the active part should this be burned out or meet with an accident without disturbing the rest of the couple and apparatus. In carrying out my invention I provide a thermo-electric couple 1, composed of two separable sections, a primary or active section 2 and a secondary section 3, the broken terminals 4 of which are adapted to be connected when the couple is in use. The cold ends of the couple 1—that is, the outer ends of the secondary section 3—are connected to the socket 5, which may contain a suitable compensating means, such as the means illustrated in my prior Patent, No. 783,503. Into this socket fits an ordinary plug carrying the leads 6 and 7, which are connected to a suitable indicating or recording device 8. By making the couple 1 separable the secondary section 3 may be permanently attached to the furnace-wall 9, as by the brackets 10, so that the primary section may be inserted and connected when required or if injured or burned out may be quickly replaced by a new one. The broken ends 4 of the primary and secondary sections are for this purpose connected by means such as an open slot-joint 11 and winged nut 12, as shown. The ends of the couples are fused or soldered to the terminal pieces, which are all made of the same metal to neutralize any secondary thermo-electric effects and are preferably of copper to insure a non-corrosive and good contact-surface. This form of connection is very simple and effective and also provides a guard against the incorrect connection of the elements of the two sections, it being manifestly impossible to connect incorrectly after the terminal pieces have once been properly fused or soldered to the elements of the couple. I do not wish, however, to be understood as implying that it is necessary to employ such terminal pieces or such form of connection, as any form of connection producing a thorough contact will suffice. In fact, the terminal pieces may be omitted entirely, and the broken terminals of the sections flattened, punched and bolted together.

By thus making the couple separable in dividing it into two sections I am enabled to greatly reduce the cost of renewals, it being necessary to renew only the primary section in case of burning out or other accidents to the active portion of the couple.

I am further enabled to facilitate the installation of the couple and to provide for a permanent installation of a part of the apparatus.

The feature of being able to remove the active part of the couple at will is especially valuable in cases where it is not desirable to have the couple inserted into the furnace or bath until the latter is ready because of danger of breakage or other possible injury to the couple in charging or discharging the furnace, &c.

Having thus described my invention, I claim:

1. A thermo-electric couple separable or capable of division between its hot and cold ends, means for permanently mounting in place the cold end or section of the couple at a point substantially unaffected by variations in the temperature to be measured and means for detachably mounting the hot end or section directly upon the cold section.

2. In combination with a heated compartment, a thermo-electric couple separable or capable of division between its hot or cold ends, the hot end or section passing through a wall of said compartment into the zone thereof, whose temperature it is desired to ascertain and the remote end of the cold section being located on the exterior of the said wall near the base thereof the hot section being mounted directly on the cold section.

3. In combination with a heated compartment, a thermo-electric couple separable or capable of division between its hot or cold ends, the hot end or section passing through a wall of said compartment into the zone thereof, whose temperature it is desired to ascertain and the remote end of the cold section being located on the exterior of the said wall near the base thereof, the joint between the hot and cold section being external to said wall.

4. In combination with a heated compartment, having a vertical wall, a thermo-electric couple separable or capable of division between its hot and cold ends, the hot end or section passing through said wall into the compartment and the cold end or section being mounted substantially vertically upon said wall with its far end near the base thereof.

5. In combination with a heated compartment, having a vertical wall, a thermo-electric couple separable or capable of division between its hot and cold ends, the hot end or section passing through said wall into the compartment and the cold end or section being mounted substantially vertically upon said wall with its far end near the base thereof, and means for detachably joining the hot and cold ends at a point external to said wall.

6. In combination with a heated compartment, having a vertical wall, a thermo-electric couple separable or capable of division between its hot and cold ends, the hot end or section passing through said wall into the compartment and the cold end or section being mounted substantially vertically upon said wall with its far end near the base thereof, and means for detachably joining the hot and cold ends at a point external to said wall, said means being incapable of operative engagement in the reverse position.

7. In combination with a heated compartment, having a vertical wall with an aperture therein, a thermo-electric couple separable or capable of division between its hot and cold ends, said couple comprising a substantially vertical cold section and a substantially horizontal hot section passing through said aperture into the interior of the compartment and means for detachably joining the two sections at a point external to the wall whereby the hot section may be removed through said aperture without disturbing the cold section.

8. In combination with a heated compartment, having a vertical wall with an aperture therein, a thermo-electric couple separable or capable of division between its hot and cold ends, said couple comprising a substantially vertical cold section and a substantially horizontal hot section passing through said aperture into the interior of the compartment and means for detachably joining the two sections at a point external to the wall, whereby the hot section may be removed through said aperture without disturbing the cold section, the far end of the cold section of the couple being located near the base of the wall and remote from said aperture.

9. A thermo-electric couple separable or capable of division between its hot and cold ends and means for detachably connecting the extremities of said ends, the arms of one of the sections being of unequal lengths and always occupying the same relative position in space with reference to the other section, whereby it is incapable of coöperative engagement with the other section in the reverse position.

10. A thermo-electric couple comprising a primary section and a secondary section, and a joint including open slotted members and complementary members of different construction adapted to connect the primary and secondary sections between the hot and cold ends of the couple, one of said slotted members carried by the primary section and the other carried by the secondary section, whereby the sections are incapable of cooperative engagement in the reverse position.

11. A thermo-electric couple comprising a primary section and a secondary section and a joint adapted to connect the primary and secondary sections between the hot and cold ends of the couple, said joint including a slot in one extremity of the cold end and a slot in the opposite extremity of the hot end, and clamping means carried by the unslotted extremities, whereby the hot and cold ends are incapable of coöperative engagement in the reverse position.

WILLIAM H. BRISTOL.